VARIABLE SPEED TRANSMISSION

Original Filed Aug. 30, 1963 5 Sheets-Sheet 1

INVENTORS
ROBERT C. WARREN, &
ROBERT G. ADAMS
BY
McMorrow, Berman & Davidson
ATTORNEYS

VARIABLE SPEED TRANSMISSION

Original Filed Aug. 30, 1963 5 Sheets-Sheet 2

INVENTORS
ROBERT C. WARREN, &
ROBERT G. ADAMS
BY
McMorrow, Berman & Davidson
ATTORNEYS

VARIABLE SPEED TRANSMISSION

Original Filed Aug. 30, 1963 5 Sheets-Sheet 3

INVENTORS
ROBERT C. WARREN,
ROBERT G. ADAMS
BY
McMorrow, Berman & Davidson
ATTORNEYS

VARIABLE SPEED TRANSMISSION

Original Filed Aug. 30, 1963 5 Sheets-Sheet 4

INVENTORS
ROBERT C. WARREN, JR.
ROBERT G. ADAMS
BY
McMorrow, Berman + Davidson
ATTORNEYS

VARIABLE SPEED TRANSMISSION

Original Filed Aug. 30, 1963 5 Sheets-Sheet 5

INVENTORS
ROBERT C. WARREN, JR.
ROBERT G. ADAMS
BY
McMorrow, Berman & Davidson
ATTORNEYS United States Patent Office Re. 26,953
Reissued Sept. 22, 1970

26,953
VARIABLE SPEED TRANSMISSION

Robert C. Warren, 26 Salem Ave., and Robert G. Adams, P.O. Box 508, both of Carbondale, Pa. 18407

Original No. 3,255,644, dated June 14, 1966, Ser. No. 305,621, Aug. 30, 1963. Application for reissue June 14, 1968, Ser. No. 741,822
Int. Cl. F16h *3/02, 3/08*
U.S. Cl. 74—745 21 Claims

Matter enclosed in heavy brackets [ ] appears in the original patent but forms no part of this reissue specification; matter printed in italics indicates the additions made by reissue.

This invention pertains to transmission mechanisms adapted for utility in conjunction with any type of power driven vehicle, but more specifically, the instant invention relates to a transmission for land vehicles such as automobiles, trucks, tractors, busses, industrial and construction equipment.

In accordance with one of the primary objects of this invention, it is proposed to provide a variable speed transmission mechanism with means connected therewith to raise or lower the power or speed, the means being disposed ahead of the power input side of the transmission mechanism.

Another object of this invention is to provide a variable speed transmission and speed reducer of the type referred to supra, wherein all of the gears are helical.

A further object of this invention is to provide a variable speed transmission and speed reducer of the type especially designed to eliminate the need for a two-speed rear axle.

Still another object of this invention is to provide oil pressure or lubrication at all times, that is, lubrication is present whether the vehicle transmission is being driven or is under coasting conditions.

A still further object of this invention is to provide a variable speed transmission and speed reducer therefor of the type generally described above wherein size of the gearing may be materially reduced which, in turn, effects a saving in the weight and consequently gives rise to the transportation of a greater vehicle pay load.

Another object of this invention is to provide a variable speed transmission mechanism and speed reducer therefor wherein all of the gears thereof are in constant mesh.

It is a further object of this invention to provide means for the full lubrication of the transmission in the event the vehicle must be towed thereby preventing the burning up of the drive or axle shafts or the usual removal thereof.

Still another object of this invention is to provide a power transmission which may be used as an overdrive or an underdrive.

This invention contemplates, as a still further object, the provision of a removable bottom pan or closure member for the transmission housing to provide for inspection of the component elements thereof, and the entire transmission is especially designed to provide for a minimum expenditure of time and effort to effect any required repair or replacement of parts therefor. Additionally, the instant transmission has been designed so as to obviate any damage to the clutch while effecting repairs.

Another important object of this invention is to provide a transmission which will develop a greater horsepower rating by balancing the torque from the input end thereof to its output end and in so doing, reducing the drag on the gears.

A still further object of this invention is to provide a transmission of the general type referred to above which under cold climatic conditions does not require the warming up of the lubricant for effecting operation of the transmission.

As a further object of this invention, it is contemplated to provide electrically operated means for coupling the speed reducer with the transmission mechanism, the means being actuated by the closing of an electrical switch through foot contact therewith or during the operation of the clutch pedal.

While the invention as described and illustrated herein discloses electrically operable means for effecting the coupling, it will become obvious to those skilled in this art that other means could be satisfactorily substituted therefor such as, for example, pneumatic means of the pressure or vacuum type, hydraulic means, manual means, air-electric, electric-hydraulic solenoid means, or any combination, or of combinations of these means to satisfy local operating conditions and uses of the transmission.

Another important object of this invention is to provide, in a transmission mechanism, means for eliminating the end thrust on the drive and main shaft thereof.

This invention contemplates, as still a further object thereof, the provision of a variable speed transmission and speed reducer therefor which is non-complex in construction and assembly, relatively inexpensive to manufacture, and durable in use.

Other and further objects and advantages of the instant invention will become more evident from a consideration of the following specification when read in conjunction with the annexed drawings, in which.

Figure 1:
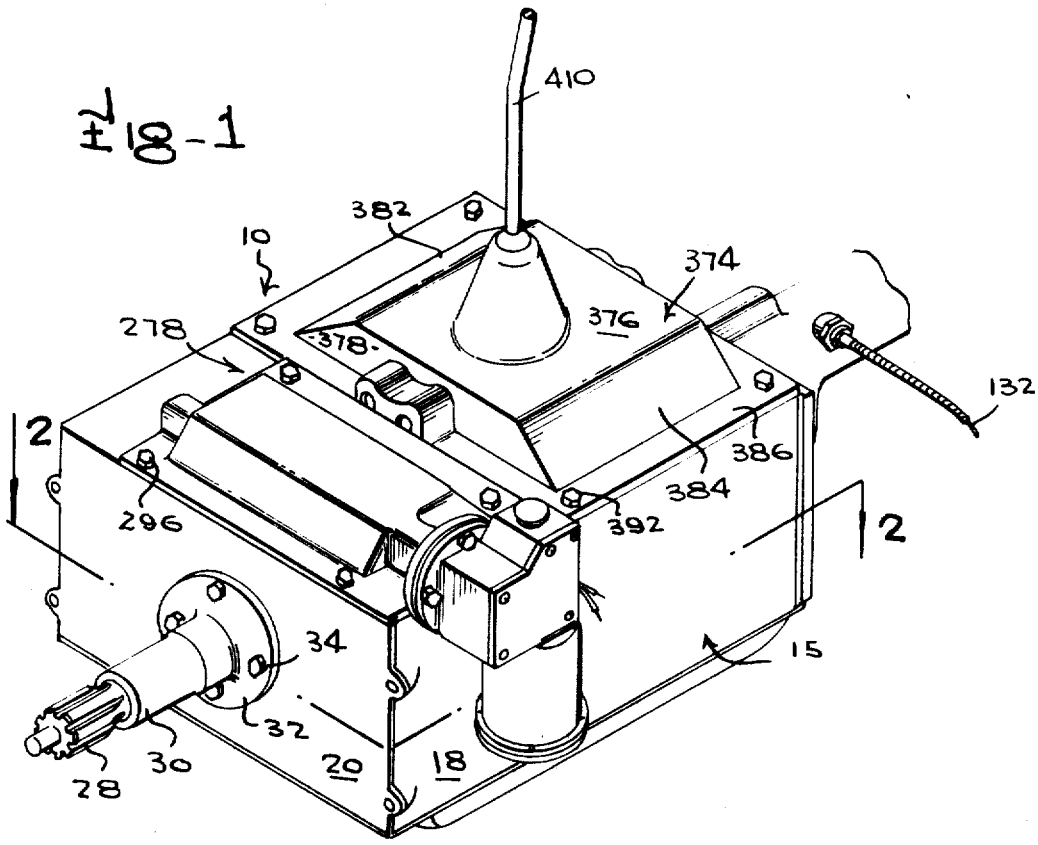
FIGURE 1 is a perspective view of a variable speed transmission mechanism together with a speed reducer therefor, the same being combined in a single unit.

Referring now more specifically to the drawings, reference numeral 10 designates, in general, a standard transmission equipped with a speed reducer or reduction gearing constructed in accordance with the teachings of this invention, and the combined mechanisms will be hereinafter referred to as a "transmission unit." As illustrated herein, the unit is seen to comprise a convention transmission 12 having three speeds forward and one speed in reverse. Reference numeral 14 denotes, in general, the speed reducer or reduction gearing device.

The unit 10 includes an elongated substantially hollow rectangular housing 15 having opposed open upper and lower ends and is defined by a pair of laterally spaced and substantially parallel side walls 16, 18 and a pair of longitudinally spaced and substantially parallel end walls 20, 22. To serve functions to be described below, the housing 15 is provided with an integrally formed transversely extending partition wall 24, the wall 24 being parallel to the end walls 20, 22 and being closer to the end wall 20 than to the end wall 22.

The end wall 20 is centrally apertured to receive a bearing 26 in which is journalled for rotation, intermediate its ends, a drive shaft 28 the exterior end of which is substantially surrounded by a drive shaft casing 30 having an outwardly flared end 32 removably secured to the end wall 20 by means of a plurality of bolts 34.

Disposed within the housing 12 adjacent the end wall 20 and integral with the shaft 28 is a driving gear assembly 36 which includes an elongated helical gear 40 and a stop or blocking gear 42 adjacent the inner end of the shaft 28. The shaft 28 at its inner end is provided with a bevelled circumferential flange 44 to which further reference will be made below.

Figure 2:
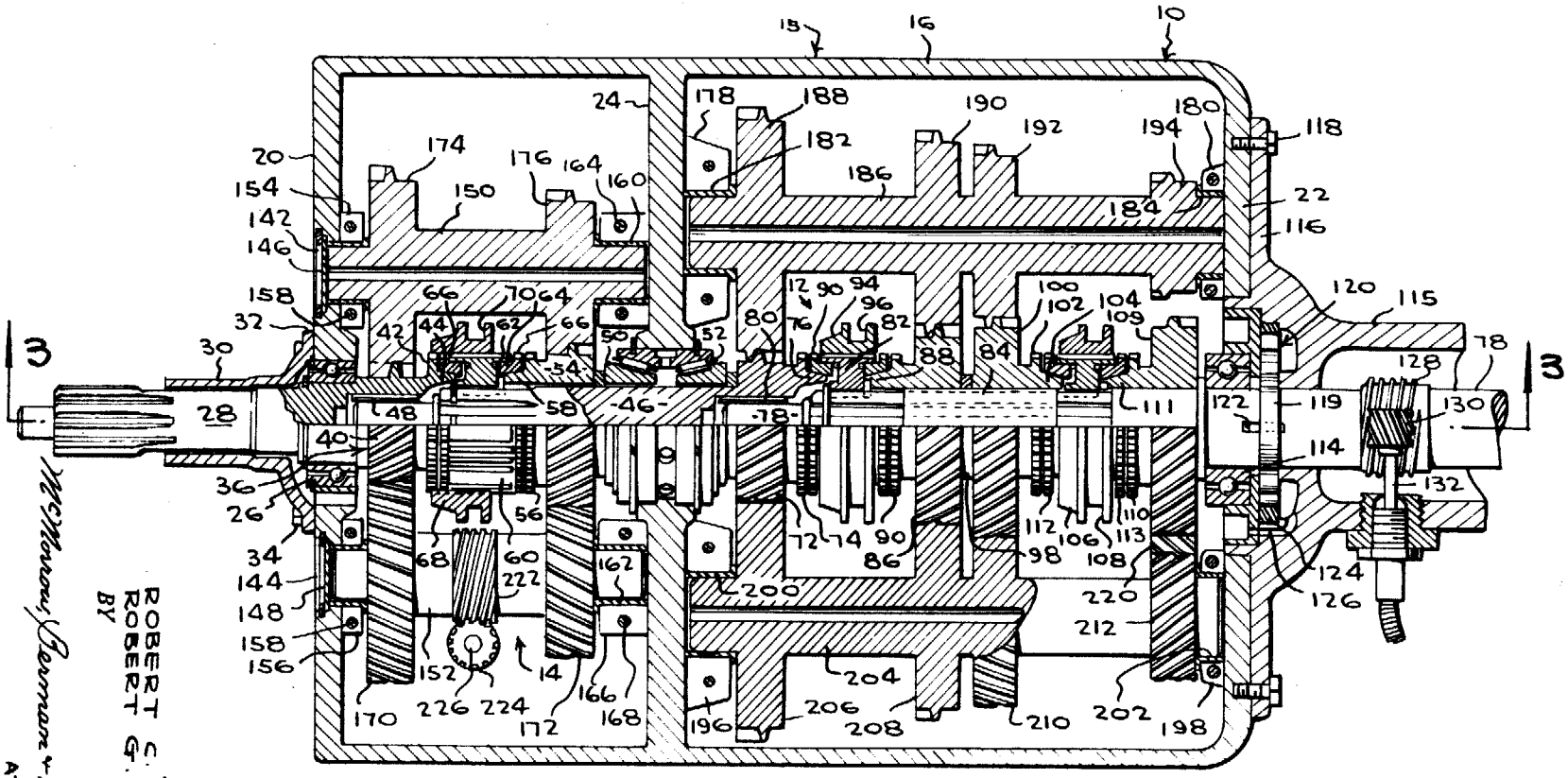
FIGURE 2 is a detail cross-sectional view of the unit illustrated in FIGURE 1, FIGURE 2 being taken substantially on the horizontal plane of line 2—2 of FIGURE 1, looking in the direction of the arrows.

One end of an elongated shaft 46 is received within the inner end of the shaft 28 and is journalled for rotation therein by needle bearings 48, and the shaft 46 is journalled for rotation intermediate its ends in bearing assemblies 50, 52 supported on the partitioned wall 24. Loosely mounted on the shaft 48 for rotation with or relative thereto is a helical gear 54 having an integrally formed stop or blocking gear 56 and a bevelled flange 58 disposed in axially spaced confronting relation relative to the blocking gear 42 and its associated flange 44. A shifting ring 60 of conventional design is mounted on and adjacent to the aforementioned one end of the shaft 46 and is splined thereto for rotation therewith. As is seen in FIGURE 2, the opposed sides of the shifting ring or blocking gear 56 is undercut at 62 adjacent the circumferential side thereof to receive therein the flanges 64 of a pair of synchronizing stop ring gears 66 which are supported on the flanges 44, 58. Splined on the shifting ring 60 for axial movement relative thereto is a synchronizing clutch sleeve 68 having a circumferential groove 70 formed therein.

The shaft 46, adjacent its other end, is integrally formed with a helical gear 72 and terminates in an integrally formed stop or blocking gear 74 and an axially extending bevelled circumferential flange 76.

One end of an elongated shaft 46 is received within the aforementioned other end of the shaft 46 and is journalled for rotation therein by needle bearings 80.

Keyed to this end of the shaft 78 is clutch shifting ring 82. A sleeve 84 is mounted on the shaft 78 and serves as a bearing for a helical gear 86 loosely supported thereon. As is seen in FIGURE 2, the gear 86 carries an axially extending bevelled flange 88 disposed in confronting relation relative to the flange 76 and a stop or blocking gear 90. Supported on the flanges 76, 88 and on opposite sides of the clutch shifting ring 82 are a pair of synchronizing ring gears 90', 92, the clutch shifting ring 82 having opposed sides thereof undercut to receive their respective flanges therebelow. Splined on the clutch shifting ring 82 is a clutch sleeve 94 having a circumferential groove 96 formed therein.

A spacer washer 98 is interposed between the helical gear 86 and a helical gear 100 loosely mounted on the sleeve 84 in juxtaposition relative to the helical gear 86. The gear 100 is integrally formed with a stop or blocking gear 102 having an annular axially extending bevelled flange 104. A clutch shifting ring 106 having a circumferential groove 108 is keyed to the shaft 78 adjacent the helical gear 100 and adjacent that side of the clutch shifting ring 106 remote from the gear 100 is loosely mounted on the shaft 78 a helical gear 109. The helical gear 109 is provided with a stop or blocking gear 110 and an axially extending bevelled flange 111. The flanges 104, 111 support a pair of synchronizing ring gears 112, 113 disposed under the undercut sides of the clutch shifting ring 106. The other end of the shaft 78, which comprises the main shaft, is journalled in suitable bearings 114 which are supported in the shaft housing 115 having a flanged end 116 secured to the end wall 22 by bolts 118. The rotor 119 of a conventional oil pump 120 is keyed at 122 to the shaft 78 for rotation within a conventional housing 124. Reference numeral 126 denotes an oil discharge passage.

Worm gear 128 on the shaft 78 meshes with a worm gear 130 connected with a speedometer cable 132 in the conventional manner.

Figure 5:
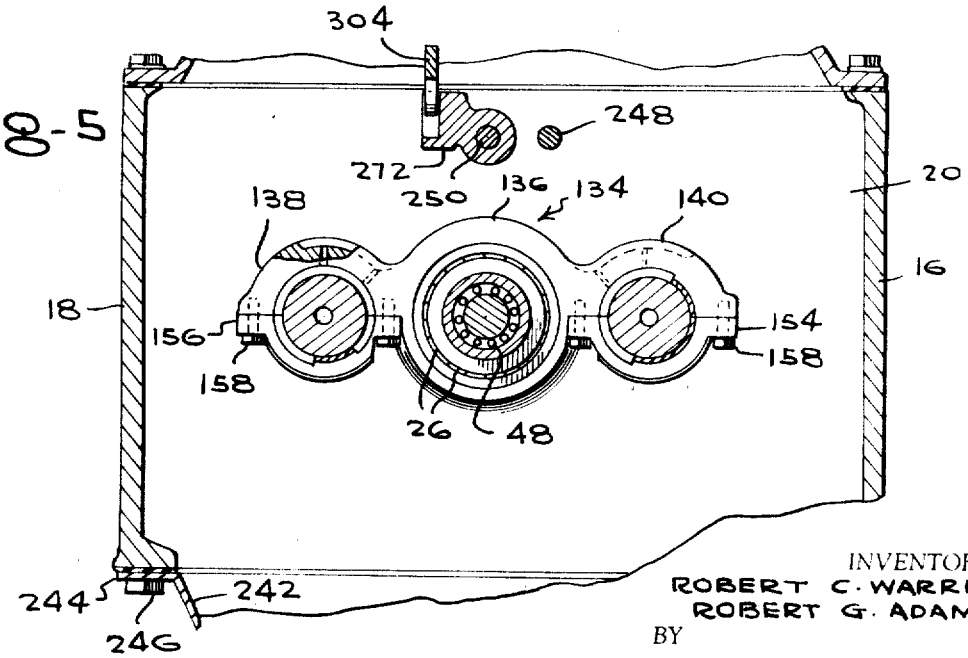
FIGURE 5 is a detail cross-sectional view taken substantially on the line 5—5 of FIGURE 3, looking in the direction of the arrows.

Referring now to FIGURES 2 and 5, it is seen that the end wall 20 is formed with a compound boss 134 of which the main or central portion 136 thereof houses the bearing [24] *26*. Projecting laterally from each side of the central portion 136 are a pair of substantially hollow semi-circular bosses 138, 140, respectively, formed adjacent the marginal edges of a pair of openings 142, 144 which extend transversely through the wall 20. Disposed within the bosses 138, 140 and the openings 142, 144 are split bushings 146, 148 in which the journalled one of the ends of a pair of shafts 150, 152. The split bushings 146, 148 and the aforementioned one ends of the shafts 150, 152 are held in their respective operative positions by means of semi-circular bushing anchors 154, 156 detachably connected to the semi-circular bosses 138, 140 by means of screws 158.

The other ends of the shafts 150, 152 are journalled in similar split bushings 160, 162 supported in similar semi-circular bosses (not shown) integral with the wall 24 and semi-circular bushing anchors 164, 166 secured thereto by screws 168. Integral with and adjacent, respectively, each end of the shaft 152 are helical gears 170, 172 of which the helical gear 170 is constantly in mesh with the helical gear 40, and the helical gear 172 is constantly in mesh with the helical gear 54. Similarly, the shaft 150 has integrally formed adjacent its respective ends the helical gears 174, 176 of which the helical gear 174 is constantly in mesh with the helical gear 40 and the helical gear 176 is constantly in mesh with the gear 54.

On the opposite side of the wall 24 and on the confronting side of the end wall 22 are disposed hollow semi-circular bosses (not shown) similar to the bosses 138, 140 which are matched by semi-circular bushing anchors 178 and 180 for bushings 182, 184 which support the opposed ends of a shaft 186. Integral with the shaft 186 and disposed adjacent one of its respective ends is a helical gear 188 which constantly meshes with the helical gear 72. Intermediate the ends of the shaft 186 and substantially centrally thereof are a pair of juxtaposed, axially spaced, integrally formed gears 190, 192 which constantly mesh with the helical gears 86, 100, respectively. Adjacent the other end of the shaft 86 and integral therewith is a helical gear 194 disposed adjacent to but spaced from the helical gear 109.

In a similar manner, and disposed on the opposite side of the shafts 46, 78 are located hollow semi-circular bosses (not shown) similar to the aforedescribed bosses 138, 140 which are disposed in confronting relation on the walls 22, 24, these semi-circular bosses cooperating with and being matched by semi-circular bushing anchors 196, 198 for bushings 200, 202 which suppport the opposed ends of a shaft 204. Integral with the shaft 204 and disposed adjacent one of its respective ends is a helical gear 206 which constantly meshes with the helical gear 72. Intermediate the ends of the shaft 204 and substantially centrally thereof are a pair of juxtaposed, axially spaced, integrally formed gears 208, 210 which constantly mesh with the helical gears 86, 100, respectively. Adjacent the other end of the shaft 204 and integral therewith is a helical gear 212 disposed adjacent to but spaced from the helical gear 109.

At diametrically opposed sides of the shaft 78 and extending parallel thereto are a pair of stub axles 214, 216 suitably supported for rotation on the end wall 22 on which are mounted, respectively, a pair of helical idler gears 218, 220 which mesh with and extend between the helical gears 194, 109 and 212, 109.

Intermediate the gears 170, 172 the shaft 152 is provided with a worm gear 222 which is in constant mesh with a worm gear 224 fixedly secured to one end of a drive shaft 226 of a conventional oil pump 228 rigidly secured to the side wall 18 by a bracket 230 and a stud 232 integral with the side wall 18. The pump 228 is provided with the usual inlet and outlet ports 234, 236, respectively, of which the former is disposed adjacent the bottom wall 238 of an elongated substantially rectangular closure member 240 having a continuous peripheral side wall 242 projecting laterally away from one side thereof, the outer end of the sidewall 242 terminating in an offset continuous flange 244. The flange 244 is detachably secured to the lower open side of the housing 15 by bolts 246.

Extending parallel to the drive shaft 28 in vertically spaced relation relative thereto and supported between the walls 20, 24 are a pair of laterally spaced cylindrical clutch shift guide rails 248, 250 for a clutch shift member 252 mounted for axial reciprocation thereon. As is seen in FIGURES 2 and 3, the member 252 has an arcuate recess or cutout portion 254 formed in the end 256 thereof whereby the same may be received within the circumferential groove 70 of the clutch sleeve 68.

Rigidly affixed to the member 252 and telescoped over the rail 250 is a sleeve 258 having an integrally formed hollow dome 260 in which is located a helicoidal spring 262 under compression which constantly tends to urge a spherical element 264 into releasable locking engagement with one of two axially spaced circumferential grooves 268, 270 formed adjacent one end of the shaft 250.

Figure 3:
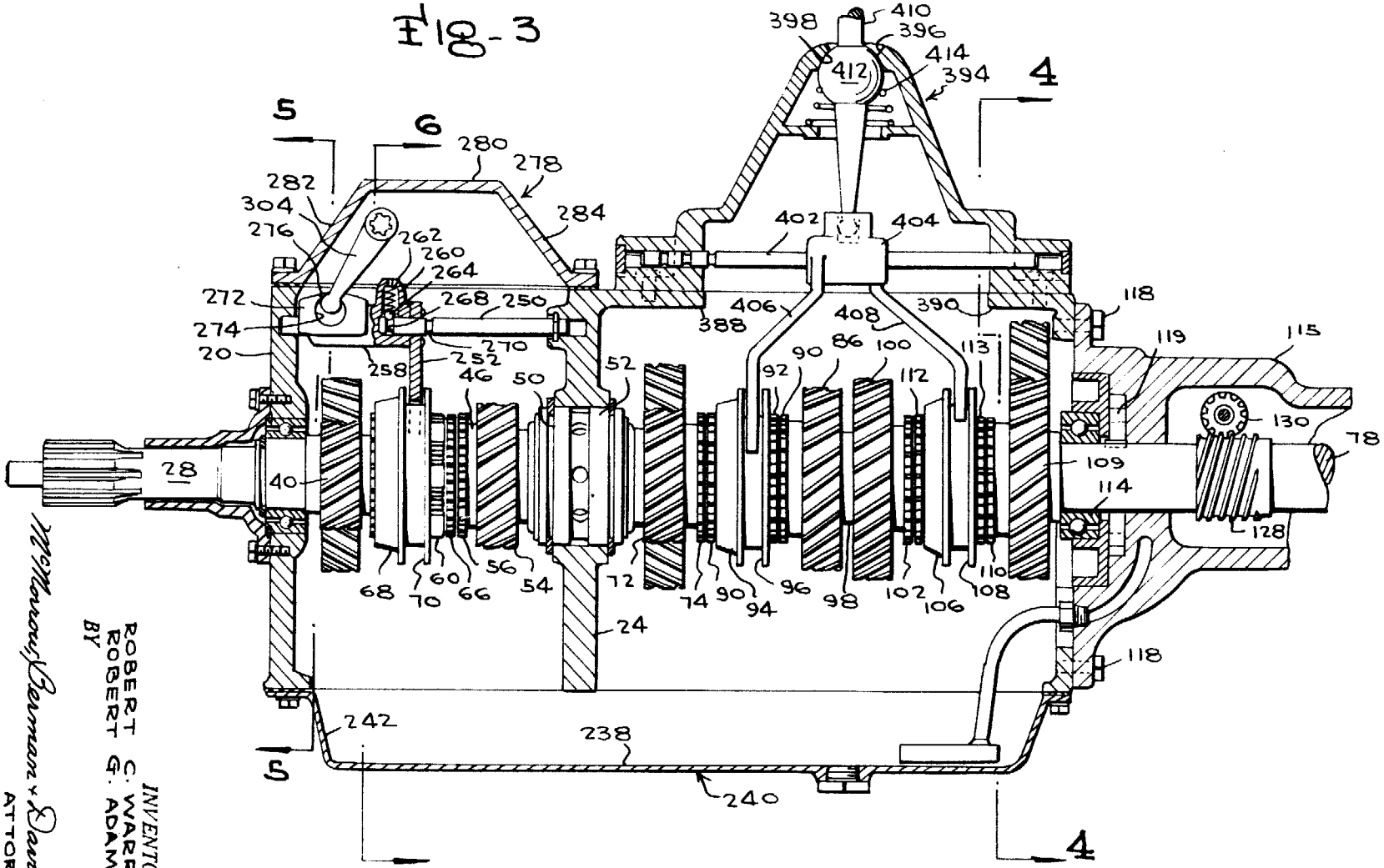
FIGURE 3 is a side elevational view of the unit illustrated in FIGURE 1, FIGURE 3 being partly in cross-section and taken substantially on the horizontal plane of line 3—3 of FIGURE 2, looking in the direction of the arrows.
Figure 4:
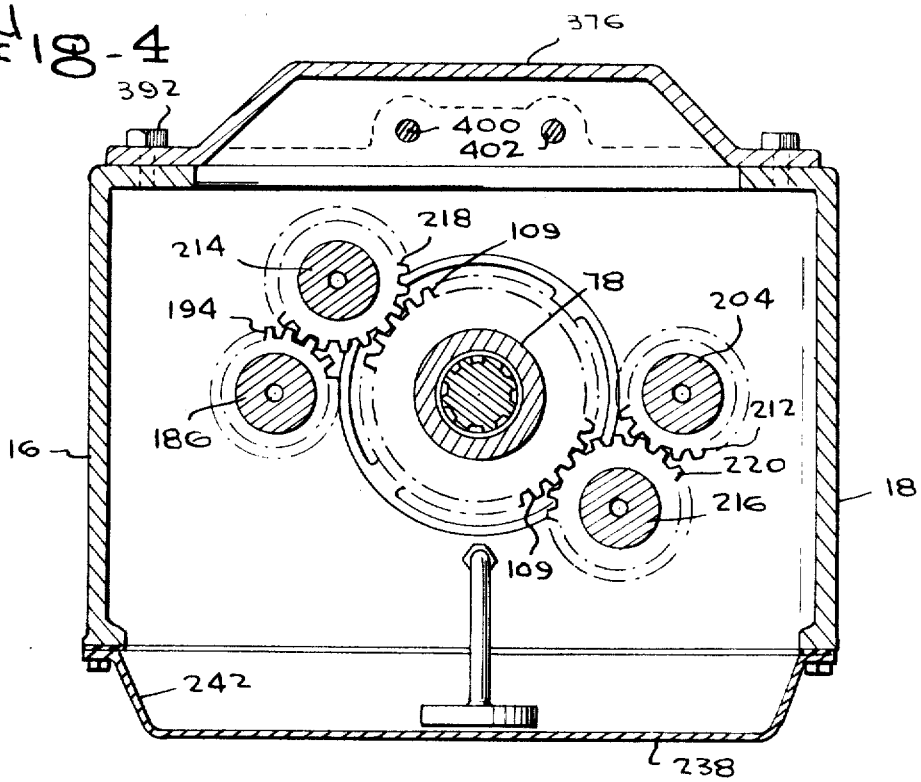
FIGURE 4 is a detail cross-sectional view taken substantially on the line 4—4 of FIGURE 3, looking in the direction of the arrows.
Figures 6, 7:
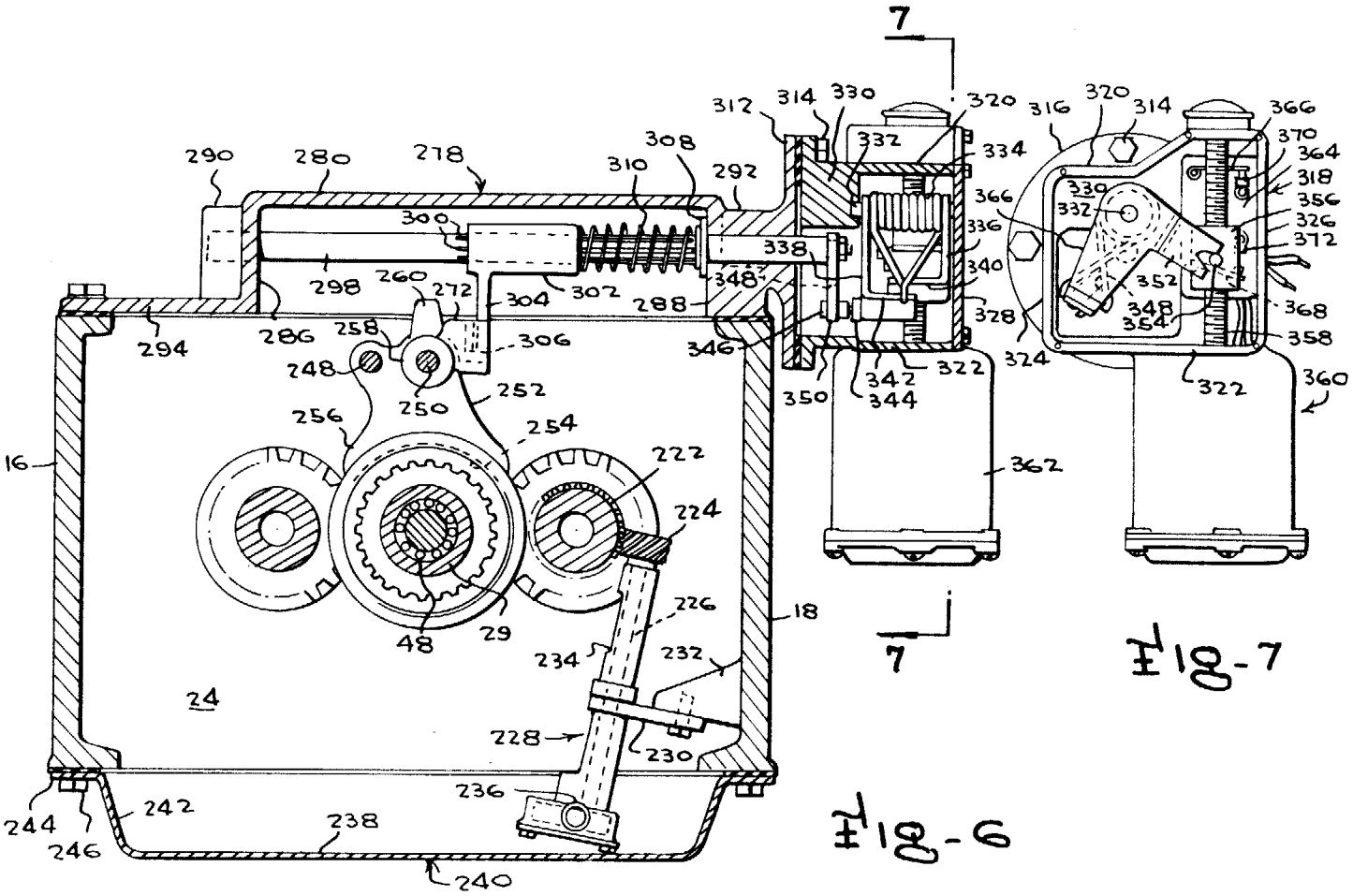
FIGURE 6 is a detail cross-sectional view taken substantially on line 6—6 of FIGURE 3, looking in the direction of the arrows.
FIGURE 7 is an end elevational view of the speed reducer actuating means including the motor therefor, FIGURE 7 being taken substantially on the vertical plane of line 7—7 of FIGURE 6, looking in the direction of the arrows.

As is illustrated in FIGURES 3 and 6, the sleeve 258 is integrally connected with an offset lug 272 having a cylindrical side opening 274 communicating with the lower end of a countersunk recess 276.

Reference numeral 278 designates, in general, a housing which includes an elongated substantially rectangular top wall 280 having downwardly diverging longitudinally extending side walls 282, 284 and end walls 286, 288. The end walls 286, 288 are each integral with extensions 290, 292 and the last mentioned side and end walls and extensions are formed with a continuous peripheral flange 294 which is bolted at 296 to the end walls 20, 24. A shaft 298 is mounted for rotation within the extensions 290, 292 and, as is seen in FIGURE 6, one end of the shaft 298 projects exteriorly of the extension 292. Intermediate its ends the shaft 298 is splined at 300 and telescopically receives thereover a splined collar 302 having a radially and downwardly extending rock lever 304 projecting therefrom. The lower end of the lever 304 extends loosely through the countersunk recess 276 and terminates in an arcuate end 306 which is loosely received within the opening 274.

Mounted on the shaft 298 adjacent the end wall 288 is a washer 308, and also mounted on the shaft 298 is a helicoidal spring 310 under compression, the spring 310 having one of its ends abutting against the washer 308 and its other end engaging the adjacent end of the collar 302.

The outer end of the extension 292 terminates in a radial flange 312 which is secured at 314 to a radial flange 316 at one side of the casing 318 having a top wall 320, a bottom wall 322, end walls 324, 326, and a side closure plate 328. Projecting inwardly from the top wall 320 and end wall 324 is a rib 330. A shaft 332 extends between and is supported on the rib 330 and the plate 328 and, in turn, supports thereon a helicoidal spring 334 and a pair of depending L-shaped brackets 336, 338 having foot portions 340, 342, respectively. As is seen in FIGURES 6 and 7, the opposed ends of the spring 334 overlap, in crossed relation, the remote sides of the foot portions 340, 342. To the foot portion 342 is secured a journal 344 for a roller 346 slidably received within an elongated longitudinally extending slot 348 formed in one end of a lever 350 having its other end fixedly secured to the shaft 298.

The switch actuator 356 is threaded on a drive shaft 358 of a reversible motor 360 having one end of its casing 362 contiguous with the bottom wall 322.

Disposed within the casing 318 is a switch plate 364 on which are mounted a pair of vertically spaced switch arms 366, 368 and their respective fixed switch contacts 370, 372. The switch arms 366, 368 are normally biased for movement towards their closed positions.

Reference numeral 374 designates, in general, a housing having an elongated substantially rectangular top wall 376 from the marginal side edges of which depend elongated side walls 378, 380 and end walls 382, 384, the side and end walls terminating in a continuous peripheral flange 386 secured to the flanges 388, 390 formed at the upper ends of the end walls 22, 24 by means of bolts 392.

An inverted hollow frusto-conical element 394 has a countersunk bore 396 extending through the frustum end thereof in communication with a circular seat 398. A centrally apertured plate extends transversely across the element 94 in spaced relation relative to the frustum end thereof.

A pair of conventional gear shift rails 400, 402 are mounted for reciprocation in the housing 374 and are connected by a conventional gear shift device 404 including the levers 406, 408 which engage within the grooves 96, 108 of the clutch sleeves 94, 106, respectively. The shifting is accomplished by means of a gear shift control shaft 410 having a spherical bearing 412 disposed within the seat 398 and is retained therein by means of a helicoidal spring 414 under compression. The lower end of the control shaft 410 is connected in the conventional manner to the device 404.

Figure 8:
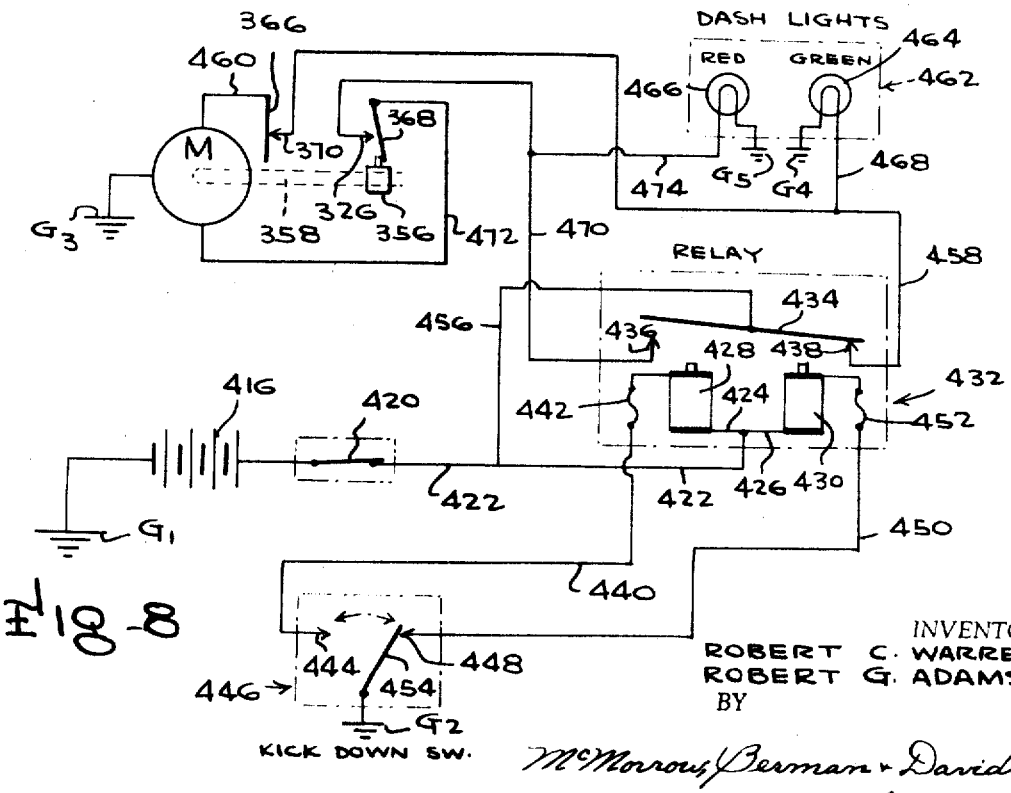
FIGURE 8 is a schematic wiring diagram illustrating the motor control means.

Reference is now made to FIGURE 8 of the drawings wherein the control circuit for the speed reducer mechanism 14 is illustrated. As shown therein, the circuit is seen to comprise a source of E.M.F. 416, which may be the vehicle battery, having a side thereof grounded at $G_1$. The other side of the source 416 connects through wire 418 to one side of a switch 420 which could comprise the vehicle ignition switch, if desired.

One end of a wire 422 is connected with the other side of the switch 420 and at its other end connects through wires 424 and 426 with one side of the windings 428, 430 of an electromagnetic relay switch 432 delineated in phantom lines and including a centrally pivoted switch arm 434, the opposed ends of which are adapted to alternately engage against a pair of fixed switch contacts 436, 438.

The other side of the winding connects through wire 440, interrupted by a fuse 442, with the fixed contact 444 of a manually operated "kick-down" switch designated at 446 and enclosed in phantom lines. The switch 446 includes a second fixed contact 448 which connects through wire 450 and fuse 452 with the other side of the winding 430, and a pivoted switch arm 454 grounded at $G_2$.

The switch 446 is preferably mounted on the floor boards of the vehicle and made readily accessible to the driver, the switch being conventional in construction and operating in a manner similar to light-dimming switches of standard construction.

From the foregoing description of a part of the circuitry of the control circuit for the speed reducer mechanism 14 it is readily seen that upon the closing of the switch 420 one or the other of the circuits to the windings 428, 430 will be energized. As illustrated in FIGURE 8, the circuit to the winding 430 is energized causing the switch arm 434 to close against the switch contact 438. This circuit may be traced from $G_1$, source of E.M.F. 416, switch 420, wires 422, 426 to one side of the winding 430. From the other side of the winding 430 current flows through wire 450, switch contact 448 and switch arm 454 closed thereagainst to $G_2$.

To effect energization of the winding 428 and the attendant closing of the switch arm 434 against the switch contact 436, the circuit may be traced from $G_1$, source of E.M.F. 416, switch 420, and wires 422, 424 to one side of the winding 428. Current flows from the other side of the winding 428 through the wire 440 and fuse 442 to the switch contact 444. Assuming that the switch arm 454 has been kicked over to engage against the contact 444, the circuit is completed through $G_2$. Obviously, with the switch arm 454 moved to its last described position, the circuit to the winding is broken and the winding becomes deenergized.

The relay switch 432 controls the reversing circuits to the motor M, and FIGURE 8 illustrates one energized control circuit and a second, deenergized, control circuit.

The energized circuit may be traced from $G_1$, the source of E.M.F. 416, switch 420, and wires 422, 456 to the switch arm 434 and switch contact 438. Wire 458 connects the contact 438 with the fixed contact 370 (see FIGURE 7) which is closed by the switch arm 366, and the latter connects through wire 460 to one side of the motor M, the other side of which is grounded at $G_3$.

Reference numeral 462 designates, in phantom lines, dashboard mounted panel lights 464, 466. As is seen in FIGURE 8, when the above circuits is energized, the light 464 is energized by virtue of the wire 468 which connects with the wire 458 and with one side of the light 464, the other side of the latter being grounded at $G_4$.

It is to be understood, of course, that this last described motor circuit will be energized only when the switch arm 454 of the kick down switch 446 closes against the switch contact 448.

To reverse the motor M, the kick down switch 446 is actuated to close the switch arm 454 against the contact 444 to energize the winding 428 and substantially simultaneously therewith deenergize the winding 430. The switch arm 434 now closes against the switch contact 436 and deenergizes the first described motor control circuit. Under these circumstances the motor M is reversed through the circuit which reads from $G_1$, source of E.M.F. 416, switch 420, wires 422, 456, switch arm 434, switch contact 436 and wire 470 to the contact 326 (see FIGURE 7).

It should be understood that when the motor M was originally energized, the switch actuator 356 moves axially of the shaft 358 until the same engages against the switch arm 366 to break the first described motor circuit and, substantially simultaneously therewith, the switch arm 368 is closed against contact 326. Thus, the reversing motor circuit is completed through switch arm 368 and wire 372 to the motor M which is again grounded at $G_3$.

Upon energization of the motor M the switch actuator moves axially of the shaft 358 in the reverse direction until the same effects the opening of the switch arm 368 from against the contact 322 while resetting the switch arm 366 in engagement with the contact 370. The motor M is thus deenergized and rotation of the shaft 358 is halted.

Upon energization of the reversing motor circuit, the light 466 is also energized through the wire 474 which connects to one side thereof, the other side being grounded at $G_5$.

To illustrate the utilization of this transmission unit 10 the following description of its operation is offered.

Let it be assumed that the component elements of the transmission unit 10 are in the positions illustrated in the several figures of the drawings, and that the switches for the motor control circuits are in their respective positions as is illustrated in FIGURE 8. Let it also be assumed that the drive shaft 28 is connected with power means (not shown) and that the shaft is now rotating. Referring to FIGURE 2 of the drawings, it is seen that the clutch sleeve 68 is in mesh with the stop or blocking gear 42 and with the synchronizing ring gear 44 thereby establishing a driving relation between the drive shaft 28 and the shaft 46. However, since the synchronizing clutch sleeves 94, 106 are in their neutral positions, no power is transmitted to the main shaft 78.

To drive the vehicle in its normal first or low gear, the shaft 410 is manually operated to shift the synchronizing clutch sleeve 106 into mesh with the stop or backing gear 102 and its adjacent synchronizing ring gear 112.

Under these conditions power is transmitted to the shaft 78 in the following manner.

As described above, the shaft 46 is now rotating with the shaft 28. Rotation of the shaft 46 effects rotation of the helical gear 72 which is integral therewith and in mesh with the helical gears 188, 206. Since the helical gears 188, 206 are integral with the countershafts 186, 204, respectively, these last named shafts will also rotate. Rotation of the countershafts 186, 204 causes rotation of the helical gears 192, 210 integral therewith, and these gears mesh with the helical gear 100 which is, as described above, loosely mounted on the sleeve 84. However, since the helical gear 100 is now connected with the shaft 78 through the stop or backing gear 102, the synchronizing ring gear 104 and the synchronizing clutch sleeve 106, the shaft 78 will rotate.

To move into a normal second speed drive, the synchronizing clutch sleeve 106 is returned to its neutral position as shown in FIGURE 2, and the synchronizing clutch sleeve 94 is shifted to the right as viewed in the referred to figure causing the same to mesh with the back or stopping gear 90 and the synchronizing ring gear 92. Now power is transmitted to the main shaft 78 through the drive shaft 28, the shaft 46, the helical gear 72, the helical gears 188, 206 and their respective countershafts 186, 204 and the helical gears 190, 208. It will be recalled that the helical gears 190, 208 both mesh with the helical gear 86 normally mounted loosely on the collar 84. However, with the clutch sleeve 94 in its above mentioned position, the helical gear 86, through the synchronized clutching means, is connected to the shaft 78 in driving relation with respect thereto.

To drive the main shaft 78 in high gear, the synchronizing clutch sleeve 94 is shifted laterally to the left, as viewed in FIGURE 2, to effect the meshing thereof with the stop or backing gear 74 and the synchronizing ring gear 90'. The drive to the main shaft 78 may be traced as follows.

As has been described above, with the drive shaft 28 rotating and being clutched to the shaft 46, the shaft 46, of course, is rotating. With the clutch sleeve 94 moved to its last named position, the main shaft 78 is directly clutched to the shaft 46 and will rotate therewith.

To obtain the benefit of the speed reduction mechanism 14, with the attendant increase in power output to the shaft 78, the kick down switch 446 is actuated to close the switch arm 454 against the switch contact 444 thereby breaking the circuit to the winding 430 and energizing the circuit to the winding 428. With the energization of the winding 428 the switch arm 434 closes against the switch contact 436 to drive the motor M in one direction in the manner described above. The motor M effects rotation of the drive shaft 358 causing the switch actuator to travel axially thereof, and in so moving, causes the closing of the switch arm 368 against the switch contact 326 and eventually opening the switch arm 366 from contact with the switch contact 370 to de-energize the motor M.

As the switch actuator 356 travels on the shaft 358, the pin 354 carried thereon rides on the bifurcated arm 352 of the bracket 336 causing the latter to rotate in a counterclockwise direction. In turn, this movement or rotation is transmitted to the bracket 338 carrying the roller 346. As the roller 346 rides in the bifurcated end of the lever 350 the shaft 298 is caused to rotate and introduces a corresponding movement in the lever 304 which is translated through the end 306 to the lug 272 and the sleeve 258. The sleeve 258 slides axially (to the right as viewed in FIGURE 3) and carries with it the clutch shift member 252 which engages within the groove 70 of the clutch sleeve 68. The movement of the member 252 is sufficient to cause the clutch sleeve [268] *68* to move into mesh with the stop or locking gear [58] *56* and the synchronizing ring gear 66. The shaft 46 is now driven through the gear trains including the helical gear 40, the meshing helical gears 170, 174, the countershafts 150, 152 and the helical gear train comprising the gears 54, 172 and 176.

The number of threads and diameter of the gears 54, 172 and 176 are carefully chosen so that with the clutch sleeve 68 shifted to its last described position, the speed of rotation of the shaft 46 will be less than if the clutch sleeve 68 were shifted to its first described and illustrated position.

Through selective operation of the clutch sleeves 94, 106, it is now seen that the operator, of the vehicle is provided with three additional speeds making a total of six speeds forward.

The main shaft 78 is provided with two speeds in reverse. The first, or normal reversing speed is obtained with the clutch sleeve 68 disposed in the position shown in FIGURES 2 and 3. As has been described above, the countershafts 186, 204 are accordingly, also rotated, and since the helical gears 194, 212 are integral therewith, these gears also rotate. The helical gears 194, 212 drive the idler gears 218, 220, which in turn, drive the reversing helical gear 109. However, reverse rotation of the shaft 78 cannot be obtained since the helical gear 109 is freely rotatable on the shaft 78 and may only be placed in driving relation with respect thereto upon the shifting of the clutch sleeve 106 into mesh with the stop or blocking gear 110 and the synchronizing ring gear 113.

The speed of the rotation of the shaft 78 may be stepped down by effecting a shifting of the clutch sleeve 68 into engagement with the stop or blocking ring 56 and the synchronizing ring gear 66 in the manner described above.

To return the transmission unit 10 to its normal range of speeds it is only necessary for the operator to actuate the switch 446 to close the arm 454 against the switch contact 448 to energize solenoid or winding 430 of the relay 432. This causes the switch arm 434 to close against the contacts 438 to effect reversal of the motor M and the return of the switch arms 366, 368 to the positions illustrated in FIGURE 8. As the switch actuator 356 returns to its original position, the shaft 298 is rotated in the opposite direction causing the member 252 to move axially relative to the rails 248, 250, in the opposite direction to reengage the clutch sleeve 68 with the stop or blocking gear 42 and the synchronizing ring gear 66.

From the foregoing specification it should now be evident that through the provision of the countershafts with their helicoidal gears (driven gears) constantly in mesh with the helicoidal driving gears except by actuation of the clutch and gear shift lever whereby the vehicle cannot roll free with no gear control, end thrust is substantially eliminated or reduced and the torque on the engaged teeth is substantially equal thereby preventing any tendency for the gears to strip especially under cold weather starting conditions.

While this invention is illustrated in conjunction with a standard three speed transmission, it is obvious that it could also be used with transmissions having other variable speeds.

It is manifest that the utilization of this invention reduces driver fatigue to a minimum and at the same time provides the driver with better shifting control which, in turn, gives rise to a greater degree of safety of operation.

The high-low speed of this transmission in reverse gear provides double the ordinary take-off speed should a power take-off be connected therewith.

The present invention is of such a nature as to provide a direct and accurate speedometer reading without the use of gear reduction units required in two speed rear axle transmissions to correct speedometer readings when using the lower speed ranges.

Through the use of the helical gears on opposite sides of the driving gears relative movement there-between in an axial direction is prevented whereby the driving gears run on a true radius or plane with no side thrust on the bearings allowing them to perform with greater efficiency and for a longer period of time.

It should also be noted that the driven gears of the transmission are journalled in insert bearings or bushings instead of ball bearings. Thus, as the bearings become worn or damaged the inserts will not allow the meshing gear teeth to separate enough to damage the gear teeth.

In the present invention, it should be noted that the gear reduction unit may be installed ahead of the regular transmission as a separate or integral part thereof and constitutes a replacement of the auxiliary units now conventionally mounted at the rear of the regular transmission.

Through the provision of the closure member 240 and its detachable connection to the housing 15, the same may be easily removed for inspection and repair or removal of any of the component elements of the transmission unit 10. The provision of the housings 294 and 278 also provide a ready inspection of the transmission unit 10.

*The following features are inherent in the transmission unit as heretofore described herein.*

*(A) The provision of respective pairs of countershafts 150, 152 and 182, 204 which are diametrically opposed relative to the main shaft means 28, 46, 78 results in a stabilization of torque and all radially directed forces on the respective shafts thereby reducing bearing wear.*

*The specific provision of helical cut gears in conjunction with diametrically opposed countershafts results in the elimination of axial thrust upon the main shaft means.*

*(B) The particular herein disclosed arrangement is such that the clutch means of the main transmission assembly 12 can be shifted to any of the three forward speed positions or to the reverse speed position while the clutch means of the auxiliary transmission assembly 14 is in either one of its two driving positions and vice versa. In other words, the driver of the vehicle can shift the main assembly clutch means 94, 106 into any of the four possible positions thereof simply by manipulating a single gear shift lever 410 and without having to also manipulate any other gear shifting means. Likewise, a high-low shifting of the auxiliary transmission clutch means 68 can be effected without manipulating the gear shift lever 410.*

*This not only facilitates the driver's work thereby reducing driver fatique, but also introduces an important safety feature in that shifting of either clutch means 68 or 94, 106 can be effected without taking the other clutch means out of gear. In fact, it is important to note that the auxiliary clutch mean 68 can never be out of gear since the control means therefor does not permit clutch means 68 to ever assume a neutral position.*

*(c) The provision of an electrical control means for actuating the auxiliary clutch means 68 is important as to ease of shifting for the driver since said driver may maintain one hand available exclusively for controlling the main assembly 12.*

*(d) The herein disclosed arrangement wherein the auxiliary assembly 14 is located between the driving engine and the main assembly 12 is important as to the amount of down time required to inspect or repair the transmission. In this regard, it is noted that the main assembly 12 generally requires considerably more frequent inspection and overhaul than does the auxiliary assembly 14. Further, disconnection of the unit from the engine end is vastly more difficult than disconnection from the drive shaft leading to the vehicle wheels. Therefore, by placing the auxiliary assembly 14 between the engine and the main assembly 12, it is possible to disassemble the main assembly 12 without having to effect any disconnection relative to the engine.*

*In this regard, it is important that the main assembly countershafts 186, 204 are completely separate from the auxiliary countershafts 150, 152 and that the last shaft 78*

*of the main shaft means 28, 46, 78 is physically separable from the preceding shafts 28 and 46.*

*(e) The construction of the housing 15 and the manner in which the respective countershafts are mounted therein is also very important as to disassambly of the main transmission assembly 12 for repairs.*

*Specifically, the provision of removable pan 240 and the fact that main countershafts 185, 204 are mounted in removable bearings which can be dropped from their normal place of mounting on the transverse housing walls 22 and 24, makes it possible to easily and quickly remove the main countershafts from the unit without having to disconnect the unit or its housing from the engine. As is well known, the cover 394 is removable from the housing 15 in order to disconnect the gear shift lever means 404 from the clutch means 96, 106.*

*After the two countershafts 186, 204 have been dropped and after the gear shift means has been disconnected from the clutch means, the entire shaft 78 with all the gears mounted therein: 72, 86, 100, and 109, as well as the clutch means 96, 106, can be withdrawn axially out of housing 15 subsequent to removal therefrom of end cover 116 and disconnection of shaft 78 from the vehicle drive shaft, this being a relatively simple task.*

*(f) The provision of two lubricating pump means 226 and 119 respectively driven off the input shaft 28 and the output shaft 78 is very important as follows.*

*When the vehicle is being towed or pushed, if its rear wheels touch the ground, the shaft 78 and the main assembly 12 will be driven although the auxiliary assembly 14 is stationary; and at this time, pump 119 prevents burn-up of the turning parts. On the other hand, when the engine is running but the main assembly 12 is in neutral, the auxiliary assembly 14 will be driven although the main assembly 12 is stationary, and at this time pump 226 will prevent burn-up of all moving parts.*

Having described and illustrated one embodiment of this invention, it is to be understood that the same is offered merely by way of example, and that this invention is to be limited only by the scope of the appended claims.

What is claimed is:

*1.* A power transmission unit comprising a casing, a drive shaft supported for rotation in said casing and having a pair of opposed ends of which one of said ends is adapted for connection with a power source, a first helical gear fixedly secured to the other end of said drive shaft for rotation therewith, a second shaft rotatably supported in said casing and having a pair of opposed ends of which one of said ends is journalled for rotation within the other end of said drive shaft, a second helical gear fixedly secured to the other end of said second shaft for rotation therewith, a main shaft rotatably supported in said casing and having a pair of opposed ends of which one of said last named ends is journalled for rotation within said other end of said second shaft, a third helical gear loosely mounted on said main shaft adjacent the other end thereof, a fourth helical gear loosely mounted on said second shaft in axially spaced relation relative to said first helical gear, said fourth helical gear being located intermediate said first and second helical gears, [a] fifth and sixth helical gears loosely mounted on said main shaft in axially spaced relation relative to each other, said fifth and sixth helical gears being disposed intermediate said second and third helical gears, a pair of countershafts rotatably supported within said casing on diametrically opposed sides of said drive shaft, a pair of helical gears fixedly mounted on each of said countershafts in axially spaced relation relative to each other, one of each pair of said last named helical gears meshing with said first helical gear, the other of said last named helical gears meshing with said fourth helical gear, synchronizing clutch means interposed between said first and fourth helical gears to effect a selective driving connection directly between said drive shaft and said second shaft or indirectly between said first helical gear and said helical gears on said countershafts and said fourth helical gear, a second pair of countershafts disposed on diametrically opposed sides of said second and main shafts, each of said last named countershafts having fixedly secured thereto for rotation therewith four helical gears of which the first thereof is meshed with said second helical gear, and the second and third thereof mesh with said fifth and sixth helical gears, respectively, synchronizing clutching means interposed between said second and sixth helical gears for effecting, selectively, a direct driving relation between said second helical gear and said main shaft or indirectly between said second helical gear and said sixth helical gear through said first and second helical gears carried on said second pair of countershafts, a pair of helical idler gears supported for rotation within said casing, said idler gears being disposed on diametrically opposed sides of said main shaft and meshing with and interposed between said third helical gear and the fourth of said helical gears on said countershafts, and synchronizing means interposed between said third and fifth helical gears to selectively connect said main shaft with said second shaft through said second helical gear, said first and third countershaft helical gears and said fifth helical gear or to reverse the direction of rotation of said main shaft through said fourth countershaft helical gear.

*2. A power transmission unit comprising an auxiliary and a main transmission assembly, respectively, the auxiliary assembly comprising an input drive shaft adapted to be driven by an engine and the main assembly comprising an output drive shaft, a main shaft means including a plurality of longitudinally aligned shafts which are rotatable at different speeds relative to each other, said main shaft means including said input and output drive shafts, each of said assemblies including a pair of countershafts extending parallel to said main shaft means on diametrically opposite sides thereof, respective helical gears axially spaced apart along the lengths of the shafts comprising said main shaft means and therewith cooperating helical gears axially spaced apart along the lengths of each of said countershafts, the said helical gears on each of the countershafts forming respective pairs of radially aligned gears which engage with a corresponding one of said helical gears on the shafts of said main shaft means, the interengaging helical gears serving to eliminate axial thrust on the shafts of said main shaft means, respective ones of the gears on said shafts of said main shaft means being integrally rotatable with the shafts upon which they are mounted, and including a means for changing the driving relationships between respective ones of the gears on the shafts of said main shaft means and the gears on said countershafts whereby a variable transmission train is established between successive ones of the shafts of said main shaft means through said countershafts.*

*3. The transmission unit of claim 2, wherein said longitudinally aligned shafts telescope into each other at axially adjacent ends thereof, the end of one of said aligned shafts serving as a bearing means for the adjacent end of the other of said aligned shafts.*

*4. A power transmission unit comprising an input drive shaft connectable to an engine and an output drive shaft connectable to a driven means, a gearing assembly interposed between said shafts for transmitting driving power from one to the other and comprising a plurality of driving and driven gear combinations of respective different gear ratios for varying the speed of said output shaft relative to said input shaft, said unit being divided into an auxiliary assembly and a main assembly each of which comprises a plurality of said gear combinations and each of which also comprises a separate clutching means movable to respective clutching positions for drivingly interengaging different ones of said driving and driven gears and for selectively establishing or interrupting driving interengagement between said auxiliary and main as-*

*semblies, the respective clutching means being actuable independently of each other whereby the interengagement of gears in either one of said auxiliary and main assemblies may be changed independently of and without changing any existing driving gear interengagement in the other of said assemblies, said input drive shaft being part of said auxiliary assembly and said output drive shaft being part of said main assembly, whereby said auxiliary assembly may be driven by an engine while said main assembly may be either driven by said auxiliary assembly or drivingly disconnected therefrom and, correspondingly, said main assembly may be driven through rotation of said output drive shaft without transmitting driving force to said auxiliary assembly.*

*5. The transmission unit of claim 4, including a manually operable gear shift lever for shifting the main assembly clutching means between respective clutching positions and a switch operated electric motor for shifting the auxiliary clutching means between respective clutching positions.*

*6. The transmission unit of claim 5, said motor being controlled by an electrical circuit which is closeable by a person-operated switch and which is openable automatically by virtue of said auxiliary clutching means arriving at either of said clutching positions from a previous one of said clutching positions, whereby said motor serves to maintain said auxiliary clutching means constantly in either of said clutching positions thereof, there being no neutral position of said auxiliary clutching means.*

*7. The transmission unit of claim 4, comprising a main shaft means including a plurality of longitudinally aligned shafts which are rotatable at different speeds relative to each other, a first of said aligned shafts being said input drive shaft, connectable to an engine for transmitting power therefrom into said auxiliary transmission assembly, a last of said aligned shafts being said output drive shaft connectable to a driven means for transmitting power thereto from said main transmission assembly, a countershaft means extending parallel to said main shaft means, respective interengaging sets of gears at axially spaced locations along said main and countershaft means for transmitting driving power from one of said longitudinally aligned shafts through said countershaft means and to a successive one of said aligned shafts, said countershaft means including a main countershaft cooperating with said main clutching means for effecting various speed ratios between the input and output speeds of said main transmission assembly and an auxiliary countershaft cooperating with said auxiliary clutching means for transmitting various of said input speeds into said main transmission assembly, said main and auxiliary countershafts being rotatively mounted independently of each other whereby they may be disassembled from said unit independently of each other.*

*8. The power transmission unit of claim 7, wherein said main shaft means comprises three coaxially aligned main shafts each being rotatable at different speeds relative to the other, a first of said main shafts being connectable to a driving means and the third one of said main shafts being connectable to a driven means, the second one of said main shafts being located axially intermediate of said first and third shafts, said countershaft means comprising a main countershaft arranged to transmit driving power from said second to said third aligned shaft, and an auxiliary countershaft arranged to transmit power from said first to said second aligned shaft, a first clutching means between said first and second aligned shafts adapted to interconnect same in either of two speed ratio driving relationships, a second clutching means between said second and third aligned shafts adapted to interconnect same in either of a plurality of speed ratio relationships in one direction and one speed ratio relationship in the opposite direction.*

*9. The power transmission unit of claim 8, said auxiliary clutching means being arranged to permanently interconnect said first and second shafts interchangeably in either of said two speed ratio relationships whereby said first and second shafts are never free of each other.*

*10. The power transmission unit of claim 4, said auxiliary clutching means being shiftable only into any of said clutching positions with no neutral position existing therefor.*

*11. The transmission unit of claim 4, wherein the number of said auxiliary clutching positions is no more than two and wherein the number of said main clutching positions is greater than two.*

*12. A power transmission unit comprising a main transmission assembly including a main clutching means movable to either of a certain number of positions each of which corresponds to a different output speed of said main assembly for a particular input speed thereto, an auxiliary transmission assembly adapted to be driven by an engine and to transmit power therefrom to said main assembly at either of a plural number of input speeds to said main assembly, said auxiliary assembly including an auxiliary clutching means movable between various clutching positions each of which corresponds to a respective different input speed to said main transmission assembly, said main clutching means being movable to any of said certain number of positions while said auxiliary clutching means is in dry one of said clutching positions, and said auxiliary clutching means being movable to any of said clutching positions while said main clutching means is in any one of said certain number of positions, comprising a main shaft means including a plurality of longitudinally aligned shafts which are rotatable at different speeds relative to each other, a first of said aligned shafts being said input drive shaft connectable to an engine for transmitting power therefrom into said auxiliary transmission assembly, a last of said aligned shafts being said output drive shaft connectable to a driven means for transmitting power thereto from said main transmission assembly, a countershaft means extending parallel to said main shaft means, respectively interengaging sets of gears at axially spaced locations along said main and countershaft means for transmitting driving power from one of said longitudinally aligned shafts through said countershaft means and to a successive one of said aligned shafts, said countershaft means including a main countershaft cooperating with said main clutching means for effecting various speed ratios between the input and output speeds of said main transmission assembly and an auxiliary countershaft cooperating with said auxiliary clutching means for transmitting various of said input speeds into said main transmission assembly, said main and auxiliary countershafts being rotatively mounted independently of each other whereby they may be disassembled from said unit independently of each other, including a common housing within which are enclosed said main and auxiliary transmission assemblies, a pair of opposite end walls forming part of said housing and a partition wall parallel to and located intermediate said end walls and separating said auxiliary assembly from said main assembly, said main shaft means extending through the three said walls with said first of said aligned shafts extending through a first of said end walls and said last of said aligned shafts extending through a second of said end walls, said auxiliary countershaft being rotatively supported at its end in bearings mounted respectively in said one of said end walls and in one side of said partition wall and said main countershaft being rotatively supported in bearings mounted respectively in said second of said end walls and the other side of said partition wall, a removable pan forming the bottom of said housing, said main countershaft bearings being supported in said partition wall and said second end wall by disassemblable bearing anchor means which, when disassembled, permit withdrawal of said main counter-*

*shaft out of a bottom opening in said housing normally enclosed by said pan, a removable top cover means normally enclosing a top opening in said housing through which said main clutching means is accessible, a manual gear shift lever extending through said top cover means and engaging said main clutching means, removal of said top cover means permitting disengagement of said gear shift lever from said main clutching means, an end wall cover means removably fastened to said second end wall, removed of said end wall cover means cresting an opening in said second end wall large enough to permit said last aligned shaft and all said gears mounted thereon to be withdrawn in an axial direction out of said housing.*

*13. The power transmission unit of claim 4, said input and output drive shafts being part of a main shaft means comprising a plurality of longitudinally aligned shafts which are rotatable at different speeds relative to each other, and further including a housing, countershaft means mounted on and between respective axially spaced apart transverse walls of said housing without passing through said walls, said input and said output shafts extending axially through respective opposite ones of said transverse walls to outwardly of said housing, said housing including a removable bottom pan normally covering a bottom opening in said housing, said countershaft means being supported on respective spaced apart ones of said transverse walls by disassemblable bearings which, when disassembled, permit dropping of said countershaft means towards said bottom openings, said main shaft means and said countershaft means including respective interengaging gears.*

*14. The transmission unit of claim 13, including a manual gear shift lever connected to said clutching means for actuating same, a removable top cover means on said housing providing access into said housing for disconnecting said lever from said clutching means, a removable end cover on the one of said transverse walls through which passes said last shaft, said end cover closing an opening in said one transverse wall large enough to permit withdrawal axially out of said housing of said last shaft with any of said gears which are mounted thereon.*

*15. The power transmission unit of claim 7, said unit being of the manually operated type in order to effect shifting between respective ones of said speed ratios, and including an oil pump means for lubricating said unit, said pump being driven off said main shaft means.*

*16. The power transmission unit of claim 15, said oil pump means comprising a first pump driven off said first shaft and a second pump driven off said last shaft.*

*17. The power transmission unit of claim 1, wherein said casing includes a removable bottom pan and wherein said second pair of countershafts are mounted in said casing independently of said first pair of countershafts and removably mounted relative to said casing whereby said second pair of countershafts can be dropped from their normally mounted position downwardly through an opening in said casing which is normally covered by said pan, said casing including an end wall having a removable end cover thereon through which said main shaft extends to outwardly of said casing, said end cover covering an end opening large enough to permit axial withdrawal of said main shaft with all of said gears which are mounted thereon from said casing through said end opening.*

*18. The transmission unit of claim 1, including an oil pump means driven respectively off said drive shaft and off said main shaft for pressure lubricating the moving parts of said unit.*

*19. The transmission unit of claim 18, wherein said oil pump means comprises a first oil pump driven by one of said first pair of countershafts and a second oil pump driven by said main shaft.*

*20. The transmission unit of claim 1, including a control means for shifting said synchronizing clutch means which is interposed between said fisrt and fourth gears to either of the aforementioned driving connection positions thereof relative to said drive and to said second shaft with out permitting this last mentioned clutch means to assume a neutral position whereby said drive and second shafts are disconnected from each other.*

*21. The transmission unit of claim 20, said control means comprising an electric motor and an electrical circuit therefor including a person-operated switch for closing said circuit and respective cut-off switches for opening said circuit located at opposite ends of the travel of the last mentioned clutch means, this last mentioned clutch means being reciprocably shiftable between opposite points which correspond respectively to said driving positions thereof and this clutch means automatically actuating said cut-off switches upon arrival of the clutch means at the respective said driving positions thereof.*

References Cited

The following references, cited by the Examiner, are of record in the patented file of this patent or the original patent.

UNITED STATES PATENTS

| | | | |
|---|---|---|---|
| 2,077,580 | 4/1937 | Patterson | 74—732 |
| 1,981,236 | 11/1934 | Logue | 74—331 X |
| 2,529,393 | 11/1950 | Hogue | 74—745 X |
| 2,932,202 | 4/1960 | Rinkema | 74—15.86 |
| 2,971,385 | 2/1961 | Miller | 74—745 X |
| 3,046,807 | 7/1962 | Barth at al. | 74—745 X |
| 3,088,336 | 5/1963 | Fodrea | 74—745 |
| 3,105,395 | 10/1963 | Perkins | 74—745 |
| 3,106,852 | 10/1963 | Miller | 74—365 |
| 3,130,596 | 4/1964 | Gorski | 74—365 |

ARTHUR T. McKEON, Primary Examiner

U.S. Cl. X.R.

74—331, 365